(12) United States Patent
Ngan

(10) Patent No.: US 7,174,187 B1
(45) Date of Patent: Feb. 6, 2007

(54) MULTIMODAL WIRELESS COMMUNICATION DEVICE WITH USER SELECTION OF TRANSCEIVER MODE VIA DIALING STRING

(75) Inventor: John C. W. Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 148 days.

(21) Appl. No.: 10/796,941

(22) Filed: Mar. 9, 2004

(51) Int. Cl.
   *H04M 1/00* (2006.01)
(52) U.S. Cl. .................. 455/552.1; 455/553.1
(58) Field of Classification Search .. 455/550.1–575.9, 455/403
   See application file for complete search history.

(56) References Cited

U.S. PATENT DOCUMENTS

| | | | |
|---|---|---|---|
| 6,011,978 A | 1/2000 | Ault et al. | 455/552 |
| 6,141,560 A | 10/2000 | Gillig et al. | 455/550 |
| 6,411,803 B1* | 6/2002 | Malackowski et al. | 455/406 |
| 6,484,027 B1* | 11/2002 | Mauney et al. | 455/421 |
| 6,658,264 B1* | 12/2003 | Irvin | 455/552.1 |
| 6,680,923 B1 | 1/2004 | Leon | 370/328 |
| 6,941,146 B2* | 9/2005 | Knauerhase et al. | 455/456.3 |
| 6,954,446 B2 | 10/2005 | Kuffner | 370/335 |
| 2002/0086636 A1 | 7/2002 | Tracy et al. | 455/3.01 |
| 2002/0102974 A1 | 8/2002 | Raith | 455/434 |
| 2002/0132635 A1* | 9/2002 | Girard et al. | 455/552 |
| 2003/0236091 A1 | 12/2003 | Wonak et al. | 455/426.2 |

FOREIGN PATENT DOCUMENTS

EP 1289235 A2 4/1995

* cited by examiner

*Primary Examiner*—Lester G. Kincaid
*Assistant Examiner*—Sayed T. Zewari

(57) ABSTRACT

A multimodal wireless device, such as a cellular telephone, includes wireless transceivers which supports communication with remote devices in two different wireless protocols, for example, convention wireless cellular telephony in accordance with CDMA or GSM standards, and wireless communication in accordance with the Bluetooth standard and/or the IEEE 802.11 standard. The user of the wireless device selects which mode the device is to use when placing a call to a called party by inputting codes or characters into a dialing string. The wireless device detects the code or characters and responsively selects the designated transceiver to place the call to the receiver in the desired wireless communication mode.

10 Claims, 6 Drawing Sheets

| DIALING STRING (# +) | 48 BIT BLUETOOTH DEVICE ADDRESS |
|---|---|
| 1244 | X1 |
| 2618 | X2 |
| 2531 | X3 |
| 1017 | X4 |
| 1051 | X5 |
| ETC. | ETC. |

MULTIMODAL WIRELESS COMMUNICATION DEVICE WITH USER SELECTION OF TRANSCEIVER MODE VIA DIALING STRING

BACKGROUND

1. Field of the Invention

This invention relates generally to generally to wireless telephony and in particular to multimodal wireless communication devices that support communications between the wireless device and called parties using more than one type or kind of wireless communications technique, e.g., CDMA (or GSM) and Bluetooth. More particularly, the invention relates to a method by selection of a particular communication mode for a call is made via a dialing string input into the device by the user.

2. Description of Related Art

The ubiquitous cellular telephone, and the cellular telephone service provider infrastructure, provides a means by which users can place and receive telephone calls over a widespread geographic region. Cellular telephone services include calling plans by which a user of cellular telephone service are charged for use of "air time," that is, actual minutes of use of the cellular telephone infrastructure. When the person is "roaming," i.e., away from their normal calling region, these charges for service can become costly, depending on the plan the user has with their service provider.

There have been several attempts in the art to help reduce the cost of cellular telephone use. These attempts have taken advantage of the observation that a wireless device like a cellular telephone may by built such that it supports wireless communication in two different modes: (1) a conventional cellular telephony mode, in which the phone communicates with an antenna and base station of cellular telephony network, and (2) a "free", short range radio frequency communication mode that is independent of the cellular telephony infrastructure. An example of mode (2) is radio frequency communication with a cordless telephone base station. When the phone is in mode (2), the calls can be placed and received via land line plain old telephone circuits connected to the cordless telephone base station, thereby avoiding the user of cellular telephony infrastructure and avoiding "air time" and the associated costs.

For example, U.S. Pat. No. 6,141,560 discloses a cellular telephone that has a dual mode of operation. The phone includes a conventional cellular transceiver for making and receiving standard cell phone calls through the cellular infrastructure, and a cordless telephone transceiver for placing calls through the conventional telephone central office and landlines via a cordless telephone base station. Typically, the cordless telephone base station would remain in the home or office, and while the phone is within range of the cordless telephone base station, the unit would place calls via the cordless telephone base station and land line, thereby avoiding air time and the use of the cellular telephone infrastructure. The '560 patent further discloses that the user may provide a preference for initiating a call as either cordless or cellular, but does not specifically teach how such preferences should be indicated. The usefulness of the '560 patent as a dual mode phone is somewhat limited, in that the cordless telephone mode is only available when the phone is within range of the cordless base station, e.g., within 50 or 100 feet or so. It would not offer any dual mode operation when the mobile phone is roaming, for example while the person is in their car or waiting to catch a flight at the airport. In these situations, the phone would only offer convention cellular telephone service.

U.S. Patent application publication no. 2002/0102974 teaches a similar arrangement for a cellular telephone. The phone has an associated cordless telephone base unit, and its usage in a cordless mode is limited to those instances in which the phone is physically proximate to the base unit. The '974 patent teaches that the mobile terminal may include a short-range radio interface, such as Bluetooth, to communicate with the base unit of a cordless telephone system.

U.S. Pat. No. 6,484,027 discloses a wireless handset that is capable of operating within a wireless network (such as a cellular or PCS network), or in direct handset-to-handset radio frequency communication that is independent of the wireless network, i.e., a "free" call. When the user wishes to call a user using the direct handset to handset communication, the user presses a "FREE" button on the handset, the transmitter/receiver or tuner tunes to the registry channel for the other handset and waits for a response indicating that the other handset is within range. If it is within range, a call request is transmitted and a channel is negotiated so that the two handsets can communicate with each other. If the other unit is out of range, the user is prompted to indicate whether the call should continue via the cellular telephone network.

Other references of interest include US patent application publication 2003/0236091; U.S. Pat. No. 6,011,978; European patent application EP 1 289 235 A2; and U.S. Patent application publication 2002/0086636. The entire contents of all of the references cited in this document are incorporated by reference herein.

SUMMARY OF THE INVENTION

The present invention provides an improved dual mode wireless telephone that supports both conventional cellular telephony calls (a first mode), and communications that are essentially free "calls" with other handsets or telephones that occur independent of the cellular telephone network, using short-range radio frequency communication standard protocols (a second mode). Examples of the short-range radio frequency communication standards protocols include Bluetooth and the IEEE 802.11 "WiFi" standard. The usage of the short-range radio frequency communication mode, and essentially free calls, can occur anywhere where there is a called party that also supports the short-range radio frequency communication standard protocol and is in range of the wireless telephone.

Furthermore, in a departure from the prior art, the user specifies whether the call should be placed in the cellular mode, or the short-range "free" mode, by how the dialing string is entered by the user. For example, the presence of # or * at the beginning of the dialing string may serve as a signal to indicate, that the call should be placed using the short-range radio frequency communication protocol (e.g., Bluetooth). When the call is to be placed in the non-cellular mode, the user may input an abbreviated dialing string (e.g., # 1234). The alphanumeric characters used in the string are associated or correlated with ID numbers of the called party by means of a table or database stored locally in the wireless phone.

The discovery of available receivers in a given geographic region using the second mode (short range, e.g., Bluetooth), could take a variety of forms, including existing discovery methods provided in the Bluetooth standard, as described in U.S. Pat. No. 6,484,027, by downloading ID numbers for known parties with Bluetooth-enabled telephones from a Web site, by manual entering the numbers, or in any other fashion.

The advantages of the invention will be apparent from a simple example. Consider an office building or similar site where there are multiple Bluetooth-enabled telephones. Now consider a user with a phone in accordance with this invention who wishes to call a person at this site that has Bluetooth enabled telephone. The user dials the number of the user (or an abbreviated number) and includes characters in the string that indicate the call is to proceed in the short-range (e.g., Bluetooth) mode. The dialing string is parsed in the phone, the character (e.g., #) indicating that the user wishes to use the short range mode is detected, and call set-up with the recipient using Bluetooth protocol proceeds. After the call set-up is established, the user thus is able to essentially have a free call to the recipient, without any use of the cellular telephone infrastructure. If the call would have otherwise been a roaming call, then the user would enjoy a substantial savings.

If, in this example, the coverage of the building in a CDMA or GSM network is poor, for example due to it being in a remote location, due to physical structures such as mountains or other features that weaken the cellular coverage, due to distance from a cellular base station, or other factors, the invention allows the call to proceed whereas it might not have if the user did not have the second mode feature of this invention.

The use of dialing strings as a method for instructing the phone which mode to use allows the phone to support this mode without providing any additional keys of buttons. This is considered an advantage over some prior systems that require a separate button to initiate a call outside of the cellular telephony infrastructure.

Thus, in a principal aspect, I have provided a wireless telephone with selectable transmission modes for a call from the wireless telephone to a remotely-located receiver. The selectable transmission modes comprises a first wireless communication mode (e.g., cellular) and a second wireless communication mode (e.g., wireless short-range communication independent of the cellular telephone infrastructure). The telephone comprises a user interface for user input of a dialing string for initiation of the call, a first transceiver for communication in accordance with the first communication mode, a second transceiver for communication in accordance with the second communication mode, and a memory storing software comprising a set of instructions for responsively selecting the first transceiver or the second transceiver for the call depending on the contents of the dialing string.

In another aspect, I have provided a method of selecting a transmission mode for a call between a wireless telephone and a remotely located receiver. The wireless telephone has a first transceiver for communication in accordance with a first communication mode and a second transceiver for communication in accordance with a second communication mode. The first communication mode comprises a cellular telephony mode and the second communication mode comprises a non-cellular wireless communication mode. The method comprises the steps of receiving a dialing string from a user of the telephone for initiation of the call, detecting attributes of the dialing string indicating that the user intends the call to be sent in accordance with the second transmission mode; obtaining, either directly or indirectly, from the dialing string an identity of the receiver in accordance with the second communication mode; and establishing a communications session in accordance with the second communication mode between the wireless telephone and the receiver.

BRIEF DESCRIPTION OF THE DRAWING

An exemplary embodiment of the present invention is described herein with reference to the drawings, in which.

DETAILED DESCRIPTION OF PREFERRED EMBODIMENT

Figure 1:
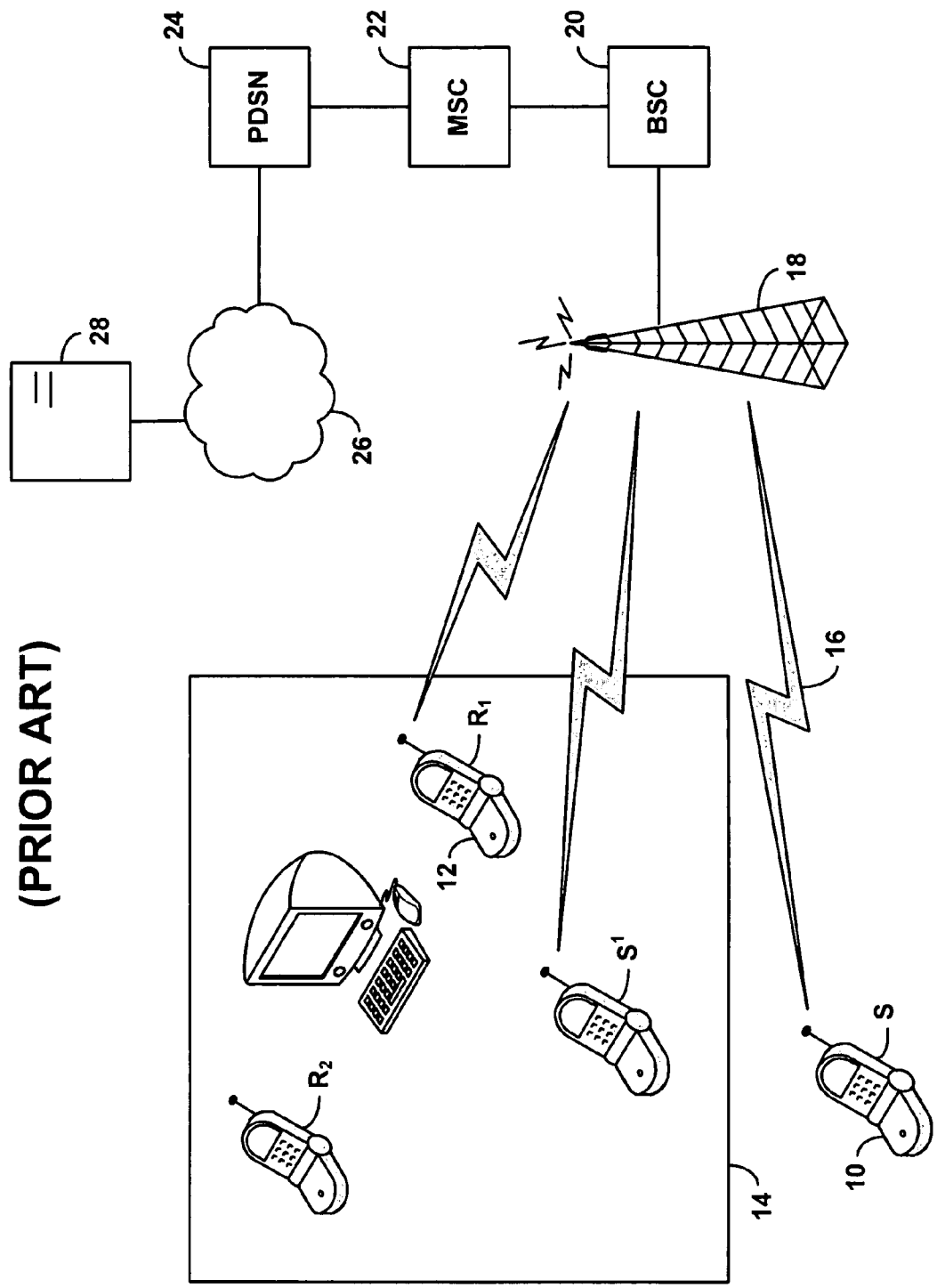
FIG. 1 is a diagram of a situation where a single mode conventional cell phone is used to communicate with various parties in a building using prior art methods.

FIG. 1 is a diagram of a situation where a single mode conventional cell phone is used to communication with various parties in a building using prior art methods. In this example, if a user of the sending or calling phone S (10) wishes to a call a receiving phone R1 (12) located in a building 14, and the sending phone S is outside of the building, the user will proceed in accordance with standard cellular telephony techniques. In particular, the call will proceed over the air interface 16 to a wireless service provider cellular antenna 18, which is operatively connected to a base station controller 20, a mobile switching center 22 and a Packet Data Serving Node 24, which is in turn coupled to a cellular telephony provider packet switched network 26. The wireless network will then direct the call over the air interface 26 to the receiver R1, and R1 and S can communicate with each other. An accounting server 28 monitors air time for the call and charges the account associated with S.

Now consider the situation where S enters the building 14 (position S¹) and wishes to call R1. The phone S again has to make use of the cellular telephone infrastructure 18, 20, 22, and 44 in order to call R1. This again will count as air time for the user S.

Figure 2:
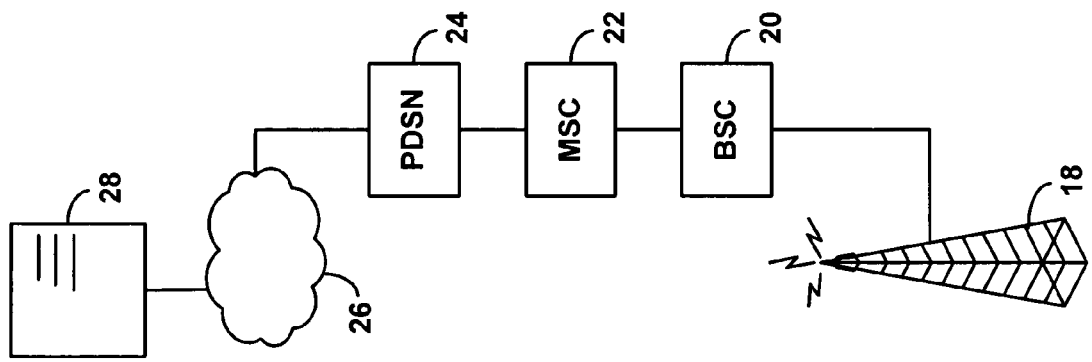
FIG. 2 is a diagram where a phone of the present invention may place "free" calls using non-cellular, short-range wireless communication protocols with the entities in the building.
Figure 2:
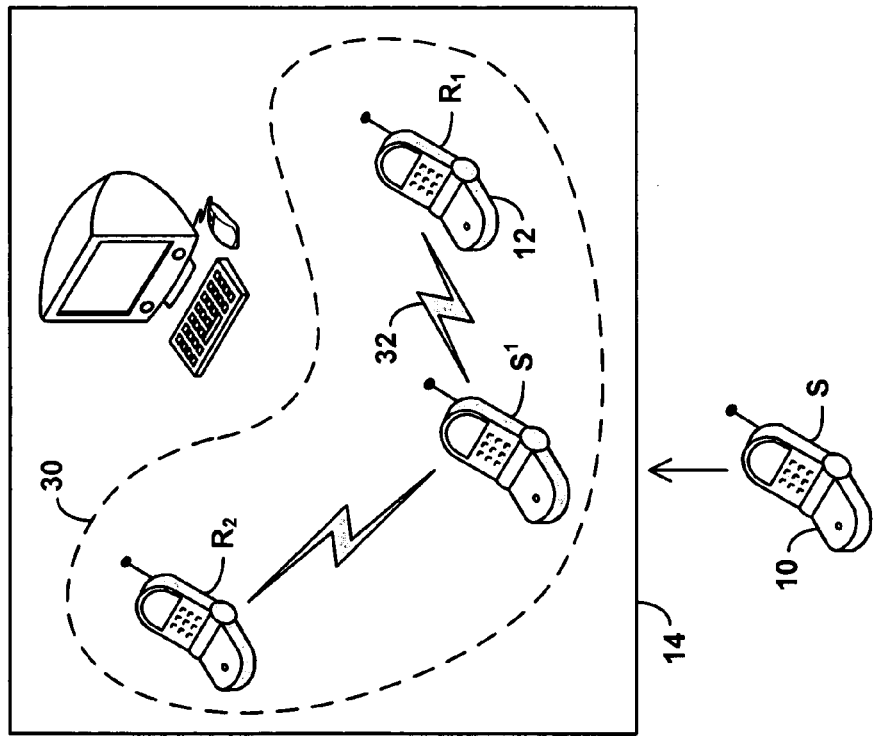

FIG. 2 is a diagram where a phone of the present invention may place "free" calls using non-cellular, short-range wireless communication protocols with the entities in the building, using the techniques of this invention. In particular, the phone is an improved dual mode wireless telephone that supports both conventional cellular telephony calls, and communications (essentially free "calls") with other handsets or telephones that occur independent of the cellular telephone network infrastructure, using short-range radio frequency communication standard protocols. Examples of the short-range radio frequency communication standards protocols include Bluetooth and the IEEE 802.11 "WiFi" standard. The usage of the short-range radio frequency communication mode, and essentially free calls, can occur anywhere where there is a called party that also supports the short-range radio frequency communication standard protocol and is in range of the wireless telephone.

In the situation of FIG. 2, the user of phone S enters the building 14 (position $S^1$) and comes within range of telephones R1 or R2. Consider the situation where both phone S and phones R1 and R2 all support Bluetooth wireless communications. When S comes within range of R1 and R2, the ability of the phone S to communicate with phones R1 and R2 will be discovered using Bluetooth discovery procedures as set forth in the Bluetooth standards. Using Bluetooth protocol, the user S may initiate a direct communications channel 32 with receiver R1 or (R2) and have essentially free communication with R1 (or R2). The call occurs without any usage of the cellular telephony infrastructure, without any associated charges, and without usage of any available cellular telephone "air time." Cellular resources within the building 14 are also conserved. In FIG. 2, the range of the Bluetooth devices is shown by the dashed line 30, and this range may be set by the devices themselves or any available Bluetooth repeaters or other devices to extend the range of individual Bluetooth devices.

Figure 3:
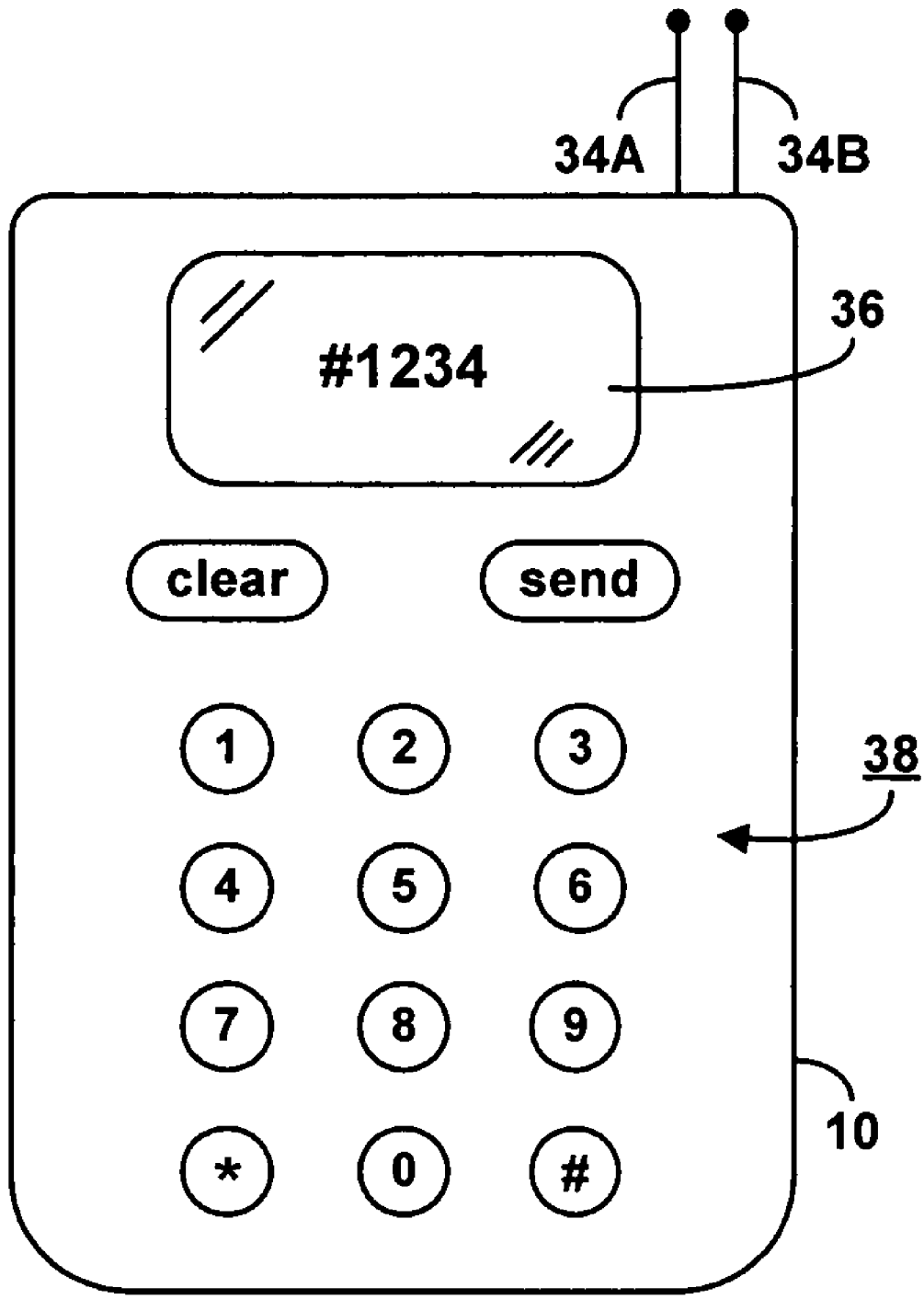
FIG. 3 is an illustration of a dual mode phone showing a dialing string input by the user indicating they wish to place a call with a particular receiver using the non-cellular "free" mode.

FIG. 3 is an illustration of a dual mode phone showing a dialing string input by the user indicating they wish to place a call with a particular receiver using the non-cellular "free" mode. The phone 10 includes two antennas 34A and 34B and associated transceivers, one for short range, non-cellular wireless communication (e.g., Bluetooth, 802.11) and the other for conventional cellular telephony. The phone includes a display 36 for displaying dialing strings that are input by the user. The phone also includes a keypad 38 for inputting alphanumeric characters in the dialing string. While the illustration of FIG. 3 is a simple example, the details on the design and construction of the user interface, display, keypad, or mode of entering of dialing strings is of course not important. In the example of FIG. 3, the user inputs the dialing string # 1234, where # signifies that the caller wishes to place the call using Bluetooth or other non-cellular protocol and 1234 is the last four digits of the called party's telephone number, and 1234 is associated with a particular Bluetooth device such that when the user presses "send" the process of setting up a communications channel with the device associated with "1234" proceeds.

Other dialing string conventions could be used to dial a device using non-cellular wireless techniques. For example, the user could assign any unique number to any particular Bluetooth device, e.g., 1=Charlie's phone, 2=Donna's phone, 3=Harold's computer (equipped with Bluetooth, speakers and microphone), etc. In this case, the user of phone S would dial # 1 for Charlie, the number 1 would be associated with the Bluetooth ID for Charlie's phone, and then phone S sets up a communications channel with Charlie's phone using Bluetooth.

Figure 4:
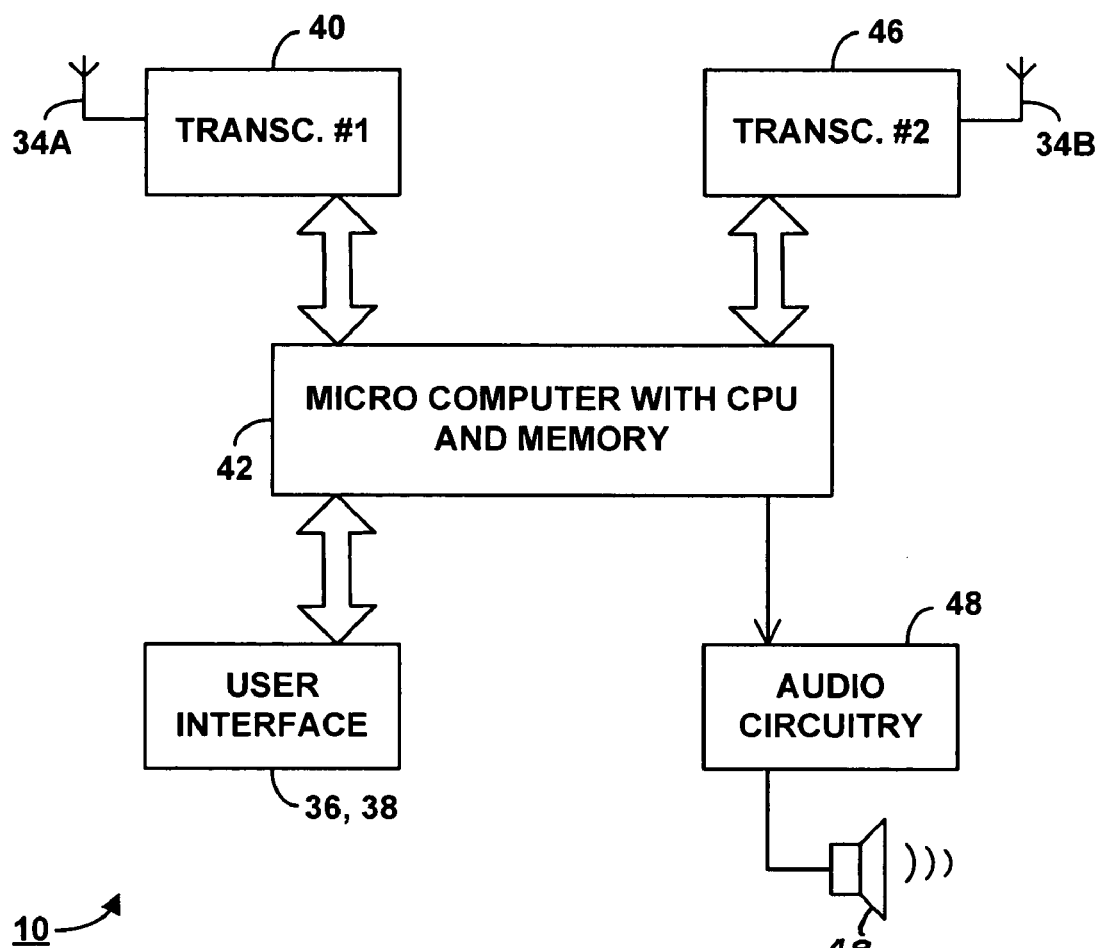
FIG. 4 is a block diagram of the phone of FIG. 3.

FIG. 4 is a simplified block diagram of the phone of FIG. 3. Multi-mode phones are known in the art (see e.g., U.S. Pat. No. 6,484,027), hence a detailed description is not necessary. The phone 10 includes a cellular telephony antenna 34A, a cellular telephony transceiver 40, and a microcomputer 42 with associated central processing unit and memory. The memory stores program instructions and input characters from the user interface 44. The phone also includes a short-range antenna 34B tuned to the frequency band for the short range wireless network (2.45 Ghz) and associated transceiver 46. The phone 10 also includes audio circuitry 48 for generating audio signals for amplification and projection from a speaker 49 built into the phone.

Figures 5, 6:
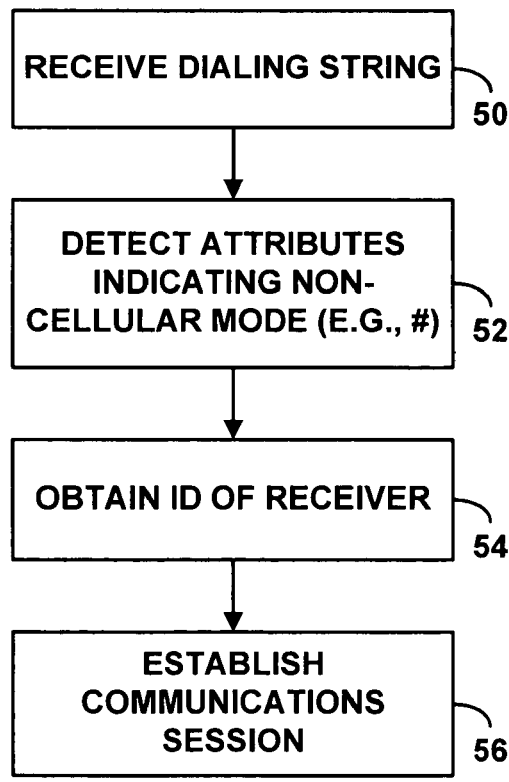
FIG. 5 is an illustration of a table that correlates dialing strings with ID numbers for remote receivers in the non-cellular communications mode; the table of FIG. 5 is stored in the memory of the phone of FIGS. 2–4.
FIG. 6 is a flow chart showing the series of steps in placing calls from the phone of FIGS. 2–5 and a remote receiver using the non-cellular communications mode.

As noted above, the user's entry of dialing string associated with the phone they wish to call is correlated or associated with a particular device address in the wireless protocol that is being used. For Bluetooth, it is a 48 bit Bluetooth Device Address. Thus, the phone 10 of FIGS. 2–4 includes a table (FIG. 5) that correlates dialing strings with ID numbers for remote receivers in the non-cellular communications mode. The table of FIG. 5 is stored in the memory of the phone of FIGS. 2–4, e.g., in the memory associated with the phone microcomputer 42 of FIG. 4. In FIG. 5, the symbols X1, X2, X3, etc. in the right hand column are meant to signify a unique 48 bit Bluetooth device address that is associated with the particular dialing string in the left hand column.

FIG. 6 is a flow chart showing the series of steps in placing calls from the phone of FIGS. 2–5 and a remote receiver using the non-cellular communications mode. At step 50, the user inputs the dialing string (e.g., # 1244) and the dialing string is stored in the memory in the phone. At step 52, a software process executing on the microcomputer 42 detects attributes in the dialing string indicating that the user wishes to place a call in the non-cellular mode, e.g., the character # (or * or other character which may be used to indicate such a call is desired). At step 52, the device obtains the ID of the receiver, for example, from the table of FIG. 5. At step 56, a communications session is established between phone 10 and the receiver associated with the dialing string. Step 56 will typically include a number of individual sub-steps that will vary depending on the communication protocol that is used for the non-cellular call. The process of FIG. 6 further assumes that a device discovery process has been previously performed to determine the identity of the Bluetooth devices that are within range of the phone 10, and the short hand abbreviation (dialing string) to use to call these devices is loaded into the phone (either m annually, downloaded from a computer, etc.).

Figure 7:
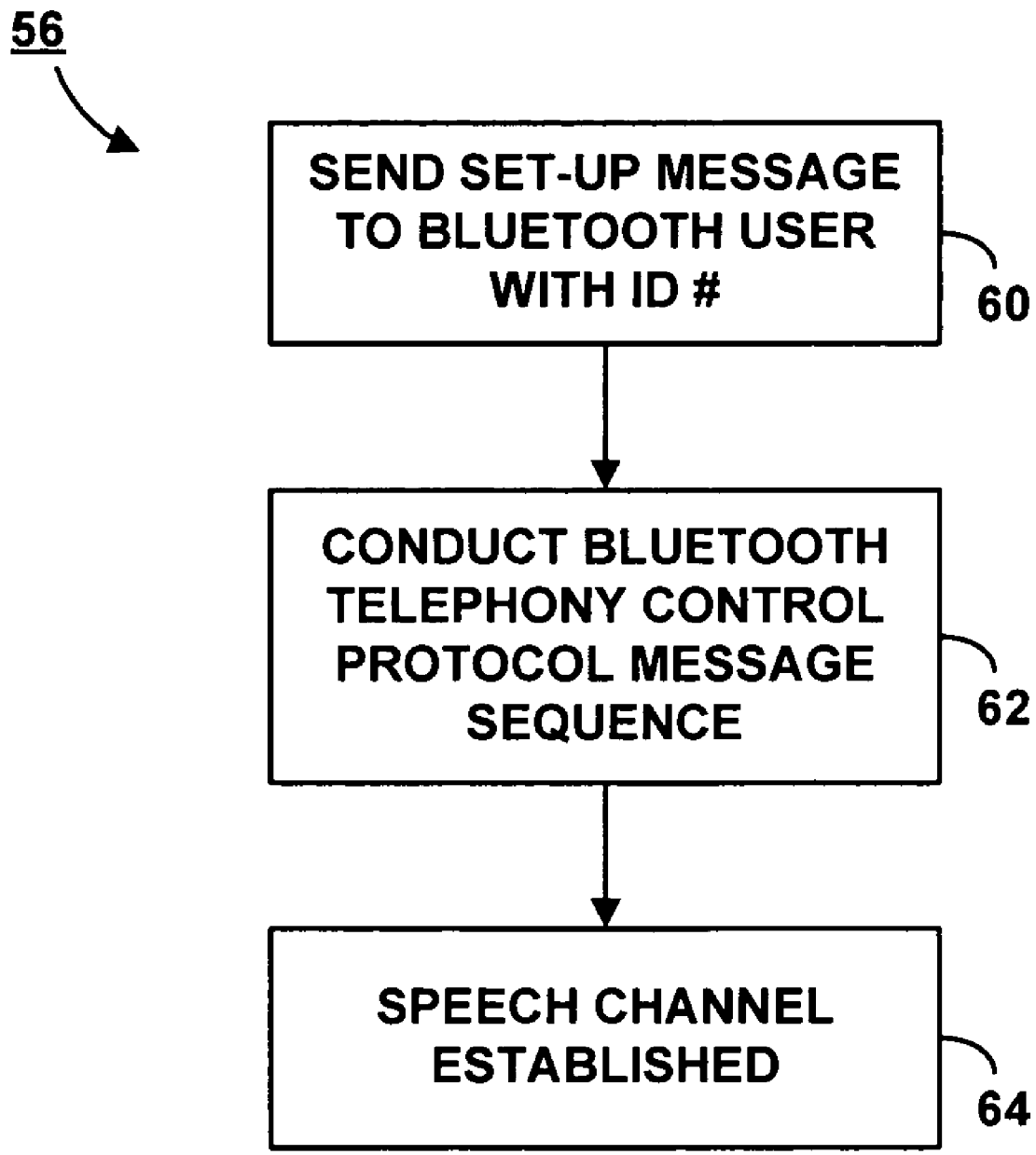
FIG. 7 is a flow chart showing the step "establish communication session" in FIG. 6 in further detail in a situation where the phone communicates with the remote receiver using Bluetooth.

FIG. 7 is a flow chart showing the step "establish communication session" 56 in FIG. 6 in further detail in a situation where the phone establishes a connection using Bluetooth. At step 60, a set-up message is sent from the sender S to the receiver R with the ID number corresponding to the dialing string input by the user. At step 62, the sender and receiver conduct a Bluetooth telephony control protocol message sequence to set up a communication channel. At step 64, the communications channel is established and sender S and receiver R can communicate using Bluetooth.

From the above description, I have provided a wireless telephone with selectable transmission modes for a call from the wireless telephone to a remotely-located receiver. The selectable transmission modes comprise a first wireless communication mode (e.g., cellular) and a second wireless communication mode (e.g., wireless short-range communication independent of the cellular telephone infrastructure). The telephone comprises a user interface for user input of a dialing string for initiation of the call, a first transceiver for communication in accordance with the first communication mode, a second transceiver for communication in accordance with said second communication mode, and a memory storing software comprising a set of instructions for responsively selecting the first transceiver or the second transceiver for the call depending on the contents of the dialing string. The remotely located receiver may comprise a Bluetooth enabled device, or an IEEE 802.11 transceiver, or may use some other protocol either known now or later developed.

The dialing string includes one or more alphanumeric characters, letters, #, *, or other character, either preceding or following the string for the receiver, to indicate that call should be placed using the non-cellular transceiver. As shown in FIG. 5, the memory in the phone may store a data structure associating dialing strings to Bluetooth user ID numbers.

From the foregoing, it will further be appreciated that I have provided a method of selecting a transmission mode for a call between a wireless telephone and a remotely located receiver. The wireless telephone has a first transceiver for communication in accordance with a first communication mode and a second transceiver for communication in accordance with a second communication mode. The first communication mode comprises a cellular telephony mode and the second communication mode comprises a non-cellular wireless communication mode. The method comprises the steps of receiving a dialing string from a user of the telephone for initiation of the call, detecting attributes of the dialing string indicating that the user intends the call to be sent in accordance with the second transmission mode; obtaining, either directly or indirectly, from the dialing string an identity of the receiver in accordance with the second communication mode; and establishing a communications session in accordance with the second communication mode between the wireless telephone and the receiver.

While presently preferred embodiments are described with particularity, the invention is not limited to the details of the illustrated embodiments. The true scope of the claims is to be determined by reference to the appended claims.

The invention claimed is:

1. A wireless telephone with selectable transmission modes for a call from said wireless telephone to a remotely-located receiver, said selectable transmission modes comprising a first wireless communication mode and a second wireless communication mode, said telephone comprising:
   a user interface for user input of a dialing string for initiation of said call;
   a first transceiver for communication in accordance with said first communication mode;
   a second transceiver for communication in accordance with said second communication mode; and
   a memory storing software comprising a set of instructions for responsively selecting said first transceiver or said second transceiver for said call depending solely on the contents of said dialing string entered by the user, the dialing string including a character or characters indicating whether the telephone should use the first transceiver or the second transceiver.

2. The apparatus of claim 1, wherein said remotely located receiver comprises a Bluetooth enabled device and wherein said second transceiver comprises a Bluetooth transceiver.

3. The apparatus of claim 1, wherein said first transceiver comprises a transceiver compliant with an IEEE 802.11 standard.

4. The apparatus of claim 1, wherein said dialing string comprises a sequence of alphanumeric characters, and either # or * preceding or following said alphanumeric characters.

5. The apparatus of claim 2, wherein memory further stores a data structure associating dialing strings to Bluetooth user ID numbers.

6. In a wireless telephone, a method of selecting a transmission mode for a call between said wireless telephone and a remotely located receiver, said wireless telephone having a first transceiver for communication in accordance with a first communication mode and a second transceiver for communication in accordance with a second communication mode, said first communication mode comprising a cellular telephony mode and said second communication mode being a local, free, non-cellular wireless communication mode, the method comprising:
   receiving a dialing string from a user of the telephone for initiation of said call,
   detecting attributes of said dialing string indicating that the user intends the call to be sent in accordance with said second transmission mode;
   obtaining, either directly or indirectly, solely from said dialing string an identity of the receiver in accordance with said second communication mode, the dialing string including a character or characters indicating whether the telephone should use the first transceiver or the second transceiver;
   establishing a communications session in accordance with said second communication mode between said wireless telephone and said receiver.

7. The method of claim 6, wherein said remotely located receiver comprises a Bluetooth enabled device and wherein said second transceiver comprises a Bluetooth transceiver.

8. The method of claim 6, wherein said second transceiver comprises a transceiver compliant with an IEEE 802.11 standard.

9. The method of claim 6, wherein said dialing string comprises a sequence of alphanumeric characters, and either # or * preceding or following said alphanumeric characters.

10. The method of claim 7, wherein said telephone includes a memory storing a database associating alphanumeric dialing strings to Bluetooth user ID numbers.

* * * * *